United States Patent [19]

Nieboer

[11] 4,394,054
[45] Jul. 19, 1983

[54] PLAY-FREE HOOK-TYPE CONNECTION

[75] Inventor: Gerrit Nieboer, Eindhoven, Netherlands

[73] Assignee: U.S. Philips Corporation, New York, N.Y.

[21] Appl. No.: 211,551

[22] Filed: Dec. 1, 1980

[30] Foreign Application Priority Data

Dec. 19, 1979 [NL] Netherlands ............... 7909125

[51] Int. Cl.³ ............... G12B 9/00; A47B 81/06
[52] U.S. Cl. ................... 312/7.2; 248/27.3
[58] Field of Search .............. 312/7.1, 7.2; 248/27.3

[56] References Cited

U.S. PATENT DOCUMENTS

| 2,692,983 | 10/1954 | Eisenkramer | 312/7.2 |
| 2,770,435 | 11/1956 | Becker | 248/27.3 |
| 2,884,626 | 4/1959 | Fink et al. | 312/7.2 |
| 2,923,038 | 2/1960 | Fitzgerald | 312/7.2 |
| 2,992,872 | 7/1961 | Bateman et al. | 312/7.2 |
| 3,086,078 | 4/1963 | Sharma | 312/7.2 |
| 3,332,648 | 7/1967 | Selinder | 248/27.3 |
| 4,053,130 | 10/1977 | Birkner | 248/27.3 |

FOREIGN PATENT DOCUMENTS

| 957490 | 1/1957 | Fed. Rep. of Germany | 248/27.3 |
| 1923535 | 12/1971 | Fed. Rep. of Germany | . |
| 40-27490 | 10/1965 | Japan | 248/27.3 |
| 1269091 | 3/1972 | United Kingdom | 248/27.3 |

Primary Examiner—Victor N. Sakran
Attorney, Agent, or Firm—Jack Oisher; William J. Streeter; Laurence A. Wright

[57] ABSTRACT

A hook-type connection for the play-free connection of two parts. A first part comprises a hook with wings which engage an edge which is formed on an abutment on a second part. In the assembled condition, the wings are pivoted about the longitudinal axis of the shank of the hook, so that the hook is subjected to a torsional load. A hook-type connection of this kind offers optimum freedom of design for the different manufacturing tolerances of the parts and the hook-type connection occuring during practice.

8 Claims, 6 Drawing Figures

PLAY-FREE HOOK-TYPE CONNECTION

The invention relates to a hook-type connection for the play-free connection of a first part to a second part, the hook-type connection comprising a flexible hook with a shank which is connected to the first part and with a pressure edge, and an abutment which is connected to the second part and has an abutment edge with which the pressure edge cooperates, at least one of the two edges enclosing an acute angle with a plane which extends substantially perpendicularly of the longitudinal direction of the shank of the hook.

BACKGROUND OF THE INVENTION

The hook of a known play-free hook-type connection of the described kind (German Gebrauchsmuster No. 1,923,535) is formed by a flexible shank which comprises, near its end which is remote from the first part, a protrusion which extends transversely of the longitudinal direction of the shank. This protrusion comprises a pressure edge which is situated in the bending plane of the shank and which encloses an acute angle with respect to a plane extending transversely of the longitudinal direction of the shank. If a sufficiently high self-tightening effect is to be ensured in such a known hook-type connection, a comparatively rigid hook is chosen and/or comparatively small angle is chosen between the pressure edge and the said plane extending transversely of the longitudinal direction of the shank. These two steps separately as well as the two steps combined lead to a substantial restriction of the freedom of design, notably as regards the dimensions of the relevant parts and the hook-type connection between these parts.

OBJECT OF THE INVENTION

The invention has for its object to provide a hook-type connection of the described kind which offers a comparatively large freedom of design while maintaining a sufficient self-tightening effect.

SUMMARY OF THE INVENTION

To this end, a hook-type connection in accordance with the invention is characterized in that the hook is locally structurally weakened in longitudinal direction of the shank and a torque is exerted on it by at least one wing which forms part of the hook and which is connected to the shank adjacent the end thereof which is remote from the first part, said wing having an edge which faces the first part and comprises said pressure edge.

Thus, the invention is based on the principle that the hook is provided with a torsion arm in the form of a wing which is pivotable or rotatable about the longitudinal axis of the shank or about an axis which is parallel to the longitudinal axis of the shank, the angle of rotation being so large that, for a given span of the wing, the hook can be hooked behind an abutment for all dimensional tolerances of the two parts and of the hook-type connection itself which occur in practice. It has been found that a sufficiently large angle of rotation of the wing is obtained when the shank of the hook is provided with a locally structurally weakened portion which extends in the longitudinal direction of the shank. The hooking force and the self-tightening effect are then completely or mainly determined by the torsional resistance of the shank. This is contrary to said known hook-type connections where the hooking force and the self-tightening effect are determined exclusively by the bending resistance of the shank.

In a preferred embodiment of the hook-type connection in accordance with the invention, the pressure edge encloses an acute angle with a first plane which extends transversely of the longitudinal direction of the shank and also encloses an acute angle with a second plane which extends parallel to the longitudinal direction of the shank and transversely of the bending plane of the shank. This offers the advantage that the design of the second part provided with the abutment may be comparatively simple.

A further preferred embodiment of the hook-type connection in accordance with the invention is characterized in that the hook comprises two identical wings which are connected to the shank adjacent the end thereof which is remote from the first part, the wings being symmetrically situated with respect to the longitudinal direction of the shank and lying mainly in two intersecting planes. An embodiment of this kind offers the advantage that no resultant lateral force is exerted by the first part on the second part.

BRIEF DESCRIPTION OF THE DRAWINGS

The invention will be described in detail hereinafter with reference to the accompanying diagrammatic drawings.

DETAILED DESCRIPTION OF THE PREFERRED EMBODIMENTS

Figure 1:
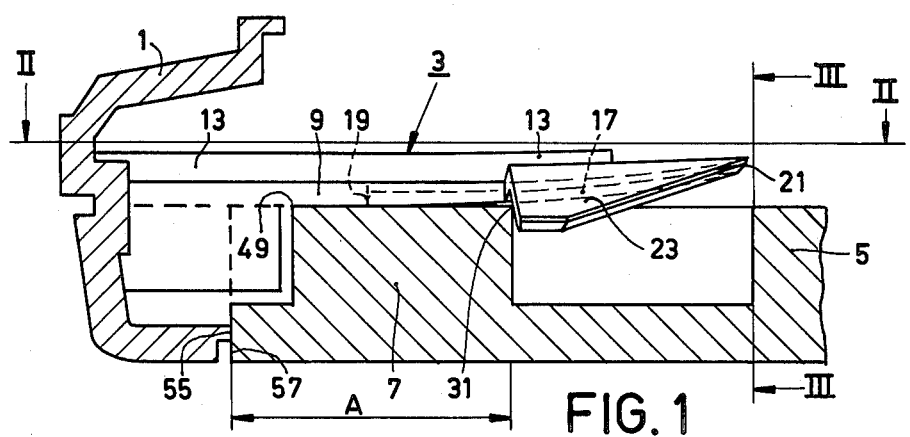
FIG. 1 is a cross-sectional view, taken along the line I—I in FIG. 2, of a preferred embodiment of a hook-type connection.

The hook-type connection shown in FIG. 1 comprises a hook 3 which is connected to a first part 1 and an abutment 7 which is connected to a second part 5. The part 1 and the hook 3 are preferably made as one integral unit. Synthetic materials such as, for example, polystyrene are very suitable for moulding the part 1 and the hook 3 as one integral unit. The second part 5 and the abutment 7 connected thereto can also be manufactured as one integral unit from a synthetic material. However, it is alternatively possible to manufacture the second part 5 with the abutment 7 as one unit from a piece of chipboard.

The hook 3 comprises an elongate shank 9 which has a strip-like cross-section. The shank 9 is symmetrical about an axis 11 which extends in the longitudinal direction of the shank (see FIG. 2). In order to ensure that the shank 9 has an adequate bending resistance in a plane which contains the longitudinal axis 11 and which is perpendicular to the plane of the drawing in FIG. 2, and also an acceptable thickness, it comprises two reinforcement ribs 13 and 15 which are symmetrically situated with respect to the longitudinal axis 11 throughout their length. The ribs 13 and 15 extend parallel to the longitudinal axis 11 before the mounting of the parts, as shown by the broken lines 14 and 16 in FIG. 2. The shank 9 is formed with a central, U-shaped channel 17 which extends along or parallel to the longitudinal axis 11 and is symmetrical with respect to this axis. The channel 17 locally weakens the shank 9 structurally. In a preferred embodiment of the hook-type connection the shank is further weakened by a slit 18 which extends along the longitudinal axis 11.

Instead of the channel 17 and slit 18 the shank 9 may be formed with a slot which is open at one end. The slit 18 extends between the points 19 and 21 in FIG. 2 (see also FIG. 3). The channel 17 is tapered in the direction from the point 21 to the point 19 (see FIG. 2).

Figure 2:
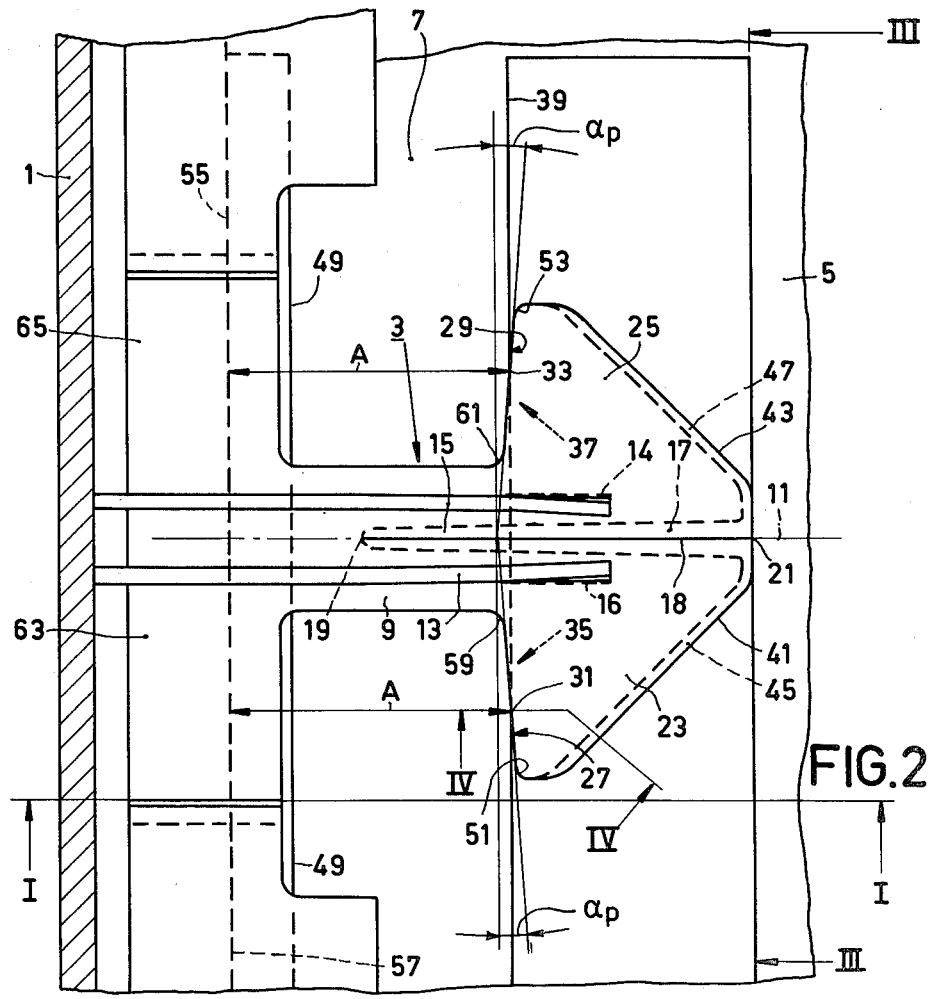
FIG. 2 is a plan view of the hook-type connection, taken along the line II—II in FIG. 1.
Figure 3:
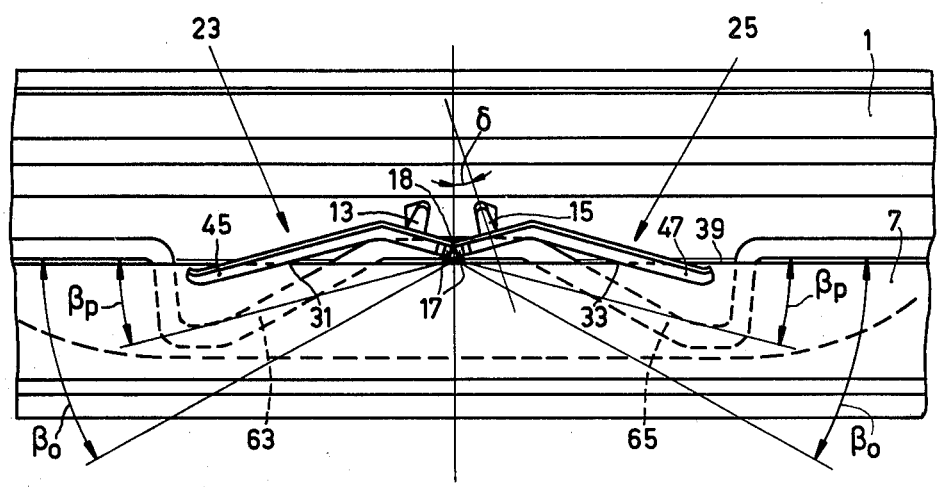
FIG. 3 is a front view of the hook-type connection, taken along the line III—III in FIGS. 1 and 2.
Figure 5:
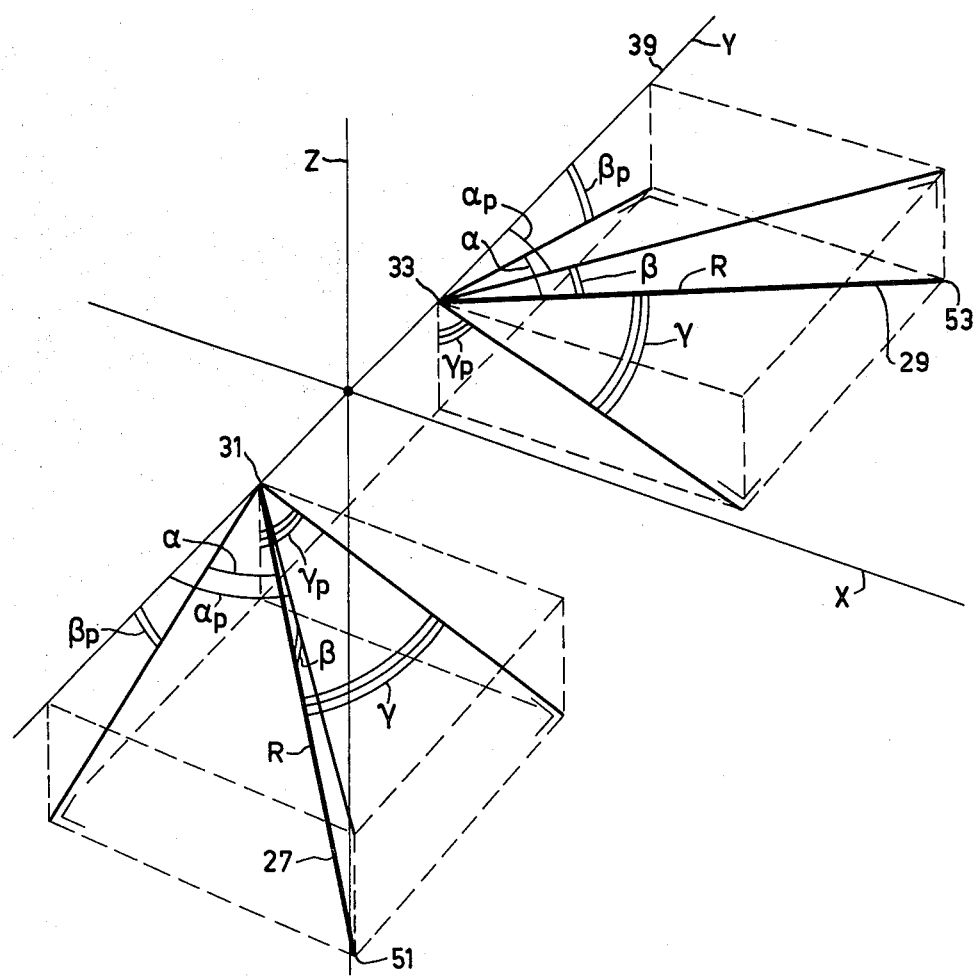
FIG. 5 shows the positions of the pressure and abutment edges in space.

Adjacent its end which is remote from the first part 1, the hook 3 comprises two identical wings 23 and 25 which are connected to the shank 9 and which are symmetrically situated with respect to the longitudinal axis 11, the wings lying mainly in two intersecting planes (see FIG. 3). In the preferred embodiment of the hook-type connection shown, the wings 23 and 25 are plate-shaped and have a uniform thickness. However, this is not necessary. The wings 23 and 25 have substantially the form of triangles with acute angles at the corners, viewed at right angles to the plane of each wing. At their edges which face the part 1 the wings 23 and 25 comprise pressure edges 27 and 29, respectively. At the points 31 and 33 (see FIGS. 1, 2 and 3), these pressure edges 27 and 29 press against abutment edges 35 and 37, respectively, which are formed by parts of an edge 39 (see FIG. 2) of the abutment 7 connected to the second part 5. The abutment 7 is formed by an elongate locally thicker portion of a wall of the second part 5, extending perpendicularly to the longitudinal axis 11 and having a rectangular cross-section, viewed in a plane which contains the longitudinal axis 11 and which extends perpendicularly to the plane of the drawing in FIG. 2. As illustrated in FIG. 5, the pressure edges 27 and 29 each enclose an acute angle $\alpha$ with the Y-Z plane. The pressure edges 27 and 29 can be projected onto the X-Y plane. This results in an angle $\alpha_p$ between the Y axis and the projection of each pressure edge 27 and 29 onto the XY plane. In order to establish the relationship between the FIGS. 5 and 2, FIG. 5 comprises reference numerals which correspond to FIG. 2, the angle $\alpha_p$ also being shown in FIG. 2. The YZ plane of FIG. 5, therefore, is the plane in FIG. 2 in which the edge 39 is situated and which extends perpendicularly to the plane of the drawing in FIG. 2. The pressure edges 27 and 29 each enclose an acute angle $\beta$ with the XY plane. The pressure edges 27 and 29 can be projected onto the YZ plane. This results in an angle $\beta_p$ between the Y axis and the projection of each pressure edge 27 and 29 onto the YZ plane. In FIG. 2, the XY plane of FIG. 5 is the plane which extends perpendicularly to the bending plane (XZ) of the shank 9 and which is parallel to the plane of the drawing in FIG. 2. The points 31 and 33 are situated in the XY plane. The XY plane in FIG. 3 is the plane which extends through the pressure points 31 and 33 and which is perpendicular to the plane of the drawing in FIG. 3. Therefore, in FIG. 3 the angle $\beta_p$ can be seen. The pressure edges 27 and 29 enclose a third acute angle $\gamma$ with the XZ plane. The pressure edges 27 and 29 can also be projected onto a plane parallel to the XZ plane. This results in the angle $\gamma_p$. The angle $\gamma_p$ is enclosed by lines extending parallel to the Z-axis through the pressure points 31 and 33 and the projections of the pressure edges 27 and 29 onto the planes containing these pressure points which are parallel to the XZ plane (see FIG. 5). In FIG. 1, only the angle $\gamma_p$ is visible which corresponds to the pressure edge 27. The significance of the angles $\alpha$, $\beta$ and $\gamma$ and $\alpha_p$, $\beta_p$ and $\gamma_p$ will be described in detail hereinafter.

Figures 4, 6:
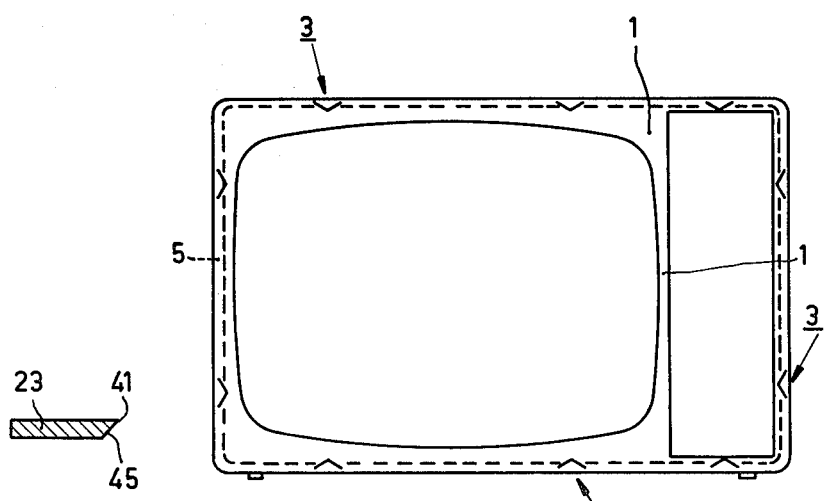
FIG. 4 is a sectional view taken along the line IV—IV in FIG. 2.
FIG. 6 illustrates the use of a hook-type connection in accordance with the invention in a television receiver.

The edges 41 and 43 of the wings 23 and 25, respectively, are remote from the part 1, which enclose an angle of approximately 45° with the longitudinal axis 11 (see FIG. 2) and are also inclined to the XY plane. The edges 41 and 43 comprise bevels 45 and 47, respectively. A cross-sectional view of the bevel 45 of the edge 41 is shown in FIG. 4. The bevels have an angle of approximately 45°. In FIG. 2, the boundaries of the bevels 45 and 47 are denoted by broken lines.

When the parts 1 and 5 are assembled, the edges 41 and 43 slide across an edge 49 (see FIGS. 1 and 2) of the abutment 7, until the wings 23 and 35 are situated on top of the abutment 7. The edge 49 of the abutment 7 is parallel to the edge 39 of the abutment 7. The wings 23 and 25, acting as rigid plates (rigid against bending), are each pivoted about the longitudinal axis 11 to an extreme position during the mounting movement, the tips of the wings sliding on the top of the abutment 7. The torsional load on the shank 9 is highest while the wings are sliding on the abutment 7. From the instant at which the tips 51 and 53 of the wings 23 and 25, respectively, pass the edge 39 of the abutment 7, the torsional load on the shank decreases to an ultimate value, an abutment face 55 on the first part 1 then bearing against an abutment face 57 on the second part. When the tolerances of the hook-type connection, the part 1 and the part 5 are correct (i.e. within the range prescribed for the manufacture), the pressure edges 27 and 29 will press against the abutment edges 35 and 37 at points which are situated between the points 51 and 59 and between the points 53 and 61, respectively, of the pressure edges, the points 51 and 53 being located at the tips and the points 59 and 61 at the roots of the wings 23 and 25 respectively. In the present case, this is at the points 31 and 33, approximately halfway along the pressure edges 27 and 29 respectively. During the manufacture of the parts 1 and 5 and the hook-type connection, the nominal dimension A shown in FIGS. 1 and 2 is adhered to; the abutment edges 35 and 37 are then engaged by the pressure edges 27 and 29 approximately halfway along the pressure edges. The permissible deviation from the nominal dimension A in practice amounts to, for example, 0.7 mm (drawing in millimeters at scale 2:1).

As is shown in FIG. 5, the length of the pressure edge 29 projecting beyond the edge 39 equals R. It is assumed that the pressure point 33 is situated halfway along the pressure edge 29, this pressure edge extending between the points 61 and 53 (see also FIG. 2). The permissible deviation from the nominal dimension A is, therefore, determined by R and $\alpha$. This will be clear from the FIGS. 2 and 5. This is because an increase of $\alpha$ with a constant R leads to an increase of $\alpha_p$, while an increase of R with a constant $\alpha$ leads to a longer pressure edge 29. The values of R and $\alpha$, therefore, determine the permissible dimensional deviations during the manufacture of the parts 1 and 5 and the hook-type connection.

The force with which the pressure edge 27 and 29 press against the edge 39 is determined mainly by the torsion of the shank 9 in the zone between the points 19 and 21 (see FIG. 2). The associated torsion angle is substantially equal to the angle $\delta$ shown in FIG. 3 if the thickness of the wings 23 and 25 and the strip thickness of the shank 9 at the area of the wings are such that the relevant part of the hook 3 behaves as a rigid plate. This is suitably approximated in the described embodiment.

Because the wings 23 and 25 lie in two planes which enclose an angle $(180°-2\beta_o)$ in the unloaded condition (see FIG. 3), the torsion angle $\delta$ satisfies the relation:

$$\delta = \beta_o - \beta_p$$

whilst $\beta_p$ satisfies the relation:

$$\beta_p = \arcsin(\sin\beta/\cos\alpha)$$

The torsion angle $\delta$ can thus be increased inter alia by choosing a larger angle $\beta_o$ or by increasing the height of the abutment 7.

It is to be noted that the shank 9 is widened by way of two strips 63 and 65 (see FIG. 2) near its end which faces the first part 1, said strips lying in the same two intersecting planes as the wings 23 and 25 in the unloaded condition of the wings. The strips 63 and 65 thus lie in planes which enclose the angle $(180°-2\beta_o)$, because they are not deformed when the wings 23 and 25 are loaded.

The described hook-type connection is self-tightening if the following relation is satisfied:

$$0 < \tan\gamma_p < f_r$$

in which $f_r$ is the friction coefficient occurring between the pressure edges and the abutment edges. For example, if polystyrene is used for the hook 3 and wood is used for the abutment 7, the friction coefficient amounts to approximately 0.5. This means that the angle $\gamma_p$ should satisfy the relation:

$$0 < \gamma_p < 26.6°$$

The tangent of $\gamma_p$, however, may exceed the value of the friction coefficient if the pressure edges and the abutment edges are sharp. The cutting effect thereof then contributes to the desired self-tightening. The pressure edges and abutment edges of the hook-type connection are accordingly made sharp (not visible in the Figures). In practice, preferably the relation $0<\tan\gamma_p<f_r$ is satisfied and at the same time a cutting effect is obtained. The hook-type connection thus obtained is not only self-tightening but is also capable of withstanding shocks and vibrations. The hook-type connection thus acquires a built-in resistance to becoming detached due to shocks and vibrations.

Because the reinforcement ribs 13 and 15 on the shank 9 permit only very slight bending of the shank (in a plane perpendicular to the plane of the drawing in FIG. 2), the force with which the pressure edges press against the abutment edges is delivered almost completely by the torsion effect of the shank. The reinforcement ribs 13 and 15 offer the advantage that the thickness of the strip-shaped shank is comparatively small, so that an excessive difference in thickness is avoided between the shank and the wall of the part 1, which is often very thin. If the part 1 and the shank 9 were moulded as an integral unit from a synthetic material, this could lead to unequal wall thicknesses of the part 1 in the transition zone between the shank 9 and the part 1.

Use can also be made of the bending effect as well as the torsion effect of the shank by constructing the shank so that it is comparatively flexible, for example, by the omission of reinforcement ribs, when the part 1 has sufficient bending resistance and is not made of a synthetic material.

The part 1 of the described hook-type connection shown in FIG. 6 is formed by a mask of a television receiver, while the part 5 is formed by cabinet of this receiver to which the mask is to be hooked. The cabinet comprises a number of abutments 7 along its circumference. The mask comprises a corresponding number of hooks 3 along its circumference. The hooks 3 and the mask are integrally moulded from polystyrene. The cabinet is made of chipboard and is provided with abutments 7 by a routing operation. For the sake of simplicity, the hooks 3 are only diagrammatically shown in the FIG. 6. The described hook-type connection offers special advantages for the bulk manufacture of television receivers, because the dimensions and hence the tolerances occurring are comparatively large. Moreover, different mask sizes and cabinet sizes occur during the manufacture of television receivers, so that the tolerances of the dimension A always differ. It will be clear from the foregoing that a hook-type connection in accordance with the invention offers enough design freedom to compensate for the differences occurring.

Even though the invention has been described with reference to the hook-type connection where the edge 39 (FIG. 2) extends perpendicularly to the longitudinal axis 11, it is by no means restricted thereto. For example, the edge 39 may enclose a projected angle $\alpha_p$ with the two pressure edges 27 and 29, while the pressure edges extend perpendicularly to the longitudinal axis 11. It is alternatively possible for the pressure edges 27 and 29 to enclose a arbitrary acute angle $\alpha_p$ with the relevant abutment edges 35 and 37, the abutment edges 35 and 37 and the pressure edges 27 and 29 extending substantially transversely of the plane YZ. The angle $\beta$ may be provided on the abutment 7. In the unloaded condition, the wings are then situated in one plane, not in two intersecting planes. The hook 3 may alternatively be asymmetrical and comprise only one wing. Compensation for the resultant lateral force in the connection can be achieved by using a second hook-type connection adjacent the first hook-type connection, the wing of the second connection being situated on the opposite side of the hook.

Finally, it is to be noted that the hook 3 and the abutment 7 may be formed separately from the parts 1 and 5 and secured to these parts in any convenient manner.

What is claimed is:

1. A hook-type connection for the play-free connection of a first part to a second part, the hook-type connection comprising:

a flexible hook with a shank and at least one wing mounted on said shank, said shank connected to said first part having a pressure edge, and an abutment which is connected to said second part having an abutment edge with which said pressure edge cooperates, at least one of the two edges enclosing an acute angle with a plane which extends substantially perpendicularly of the longitudinal direction of said shank of said hook, said hook being locally structurally weakened in the longitudinal direction of said shank when a torque is exerted on said shank by at least said one wing which forms part of said hook and which is connected to said shank adjacent the end which is remote from said first part, said wing having an edge which faces said first part and comprises said pressure edge.

2. A hook-type connection as claimed in claim 1 wherein said pressure edge encloses an acute angle with a first plane which extends perpendicularly of the longitudinal direction of said shank and also encloses an acute angle with a second plane which extends parallel to the longitudinal direction of said shank and perpendicularly of the bending plane of said shank.

3. A hook-type connection as claimed in claim 1 or 2 wherein said hook comprises two identical wings which are connected to said shank adjacent the end thereof which is remote from the first part, said wings being symmetrically situated with respect to the longitudinal direction of said shank and lying mainly in two intersecting planes.

4. A hook-type connection as claimed in claim 1 wherein said abutment edge of said abutment connected to said second part extends perpendicularly to the longitudinal direction of said shank.

5. A hook-type connection as claimed in claim 4 wherein said abutment connected to said second part is formed by an elongated thickened portion of a wall of said second part which thickened portion extends perpendicularly to the longitudinal direction of said shank.

6. A hook-type connection as claimed in claim 1 wherein said hook and said first part connected thereto are moulded as one unit from a synthetic material.

7. A hook-type connection as claimed in claim 1 wherein said first part is formed by a mask of a television receiver, said second part being formed by a cabinet of said television receiver.

8. A television receiver with a mask which is connected to a cabinet by means of several hook-type connections as claimed in claim 1, said hook-type connections being distributed along the circumference of said mask.

* * * * *